United States Patent
Chang et al.

(10) Patent No.: US 9,165,350 B2
(45) Date of Patent: Oct. 20, 2015

(54) IMAGE SHARPENING METHOD AND IMAGE PROCESSING DEVICE

(71) Applicant: Novatek Microelectronics Corp., Hsinchu (TW)

(72) Inventors: Chih-Kai Chang, Taichung (TW); Chih-Yuan Yang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 112 days.

(21) Appl. No.: 14/097,220

(22) Filed: Dec. 4, 2013

(65) Prior Publication Data
US 2015/0078677 A1    Mar. 19, 2015

(30) Foreign Application Priority Data

Sep. 13, 2013 (TW) .............................. 102133279 A

(51) Int. Cl.
G06K 9/40 (2006.01)
G06T 5/20 (2006.01)
G06T 5/00 (2006.01)

(52) U.S. Cl.
CPC ... *G06T 5/20* (2013.01); *G06K 9/40* (2013.01); *G06T 5/003* (2013.01); *G06T 2207/20182* (2013.01)

(58) Field of Classification Search
None
See application file for complete search history.

(56) References Cited

U.S. PATENT DOCUMENTS

| 4,561,022 | A  | * | 12/1985 | Bayer ........................... 348/622 |
| 5,602,934 | A  | * | 2/1997  | Li et al. ........................ 382/128 |
| 5,880,767 | A  | * | 3/1999  | Liu ............................... 347/251 |
| 7,444,034 | B1 | * | 10/2008 | Thistle et al. ................ 382/254 |
| 8,428,388 | B2 | * | 4/2013  | Song et al. ................... 382/266 |
| 2005/0197567 | A1 | * | 9/2005 | Qian et al. ................... 600/425 |
| 2006/0039622 | A1 | * | 2/2006 | Casale et al. ................ 382/266 |
| 2006/0279660 | A1 |   | 12/2006 | Ali |
| 2007/0098295 | A1 | * | 5/2007 | Wu .............................. 382/266 |
| 2008/0193014 | A1 |   | 8/2008 | Ecker et al. |
| 2013/0033608 | A1 | * | 2/2013 | Hong ........................... 348/187 |
| 2013/0170767 | A1 |   | 7/2013 | Choudhury et al. |
| 2014/0111532 | A1 | * | 4/2014 | Manchi ........................ 345/582 |

FOREIGN PATENT DOCUMENTS

TW         201301199         1/2013

OTHER PUBLICATIONS

"Office Action of Taiwan Counterpart Application", issued on Aug. 7, 2015, p. 1-p. 7.

* cited by examiner

*Primary Examiner* — Wenpeng Chen
(74) *Attorney, Agent, or Firm* — Jianq Chyun IP Office

(57) ABSTRACT

An image sharpening method and an image processing device are provided. The method includes: obtaining a plurality of pixels in an image; calculating a first weight of a high pass filter and a second weight of a first filter according to the pixels, and the first filter is a convolution of the high pass filter and a low pass filter; generating a sharpening filter according to the high pass filter, the first weight, the first filter and the second weight; and executing a sharpening operation on the pixels according to the sharpening filter. Accordingly, a sharpened image has better vision effects.

18 Claims, 3 Drawing Sheets

$$301 \quad \begin{bmatrix} 0 & 0 & 1 & 0 & 0 \\ 0 & 1 & 2 & 1 & 0 \\ 1 & 2 & -16 & 2 & 1 \\ 0 & 1 & 2 & 1 & 0 \\ 0 & 0 & 1 & 0 & 0 \end{bmatrix} \qquad 302 \quad \begin{bmatrix} 1 & 2 & -6 & 2 & 1 \end{bmatrix}$$

IMAGE SHARPENING METHOD AND IMAGE PROCESSING DEVICE

CROSS-REFERENCE TO RELATED APPLICATION

This application claims the priority benefit of Taiwan application serial no. 102133279, filed on Sep. 13, 2013. The entirety of the above-mentioned patent application is hereby incorporated by reference herein and made a part of this specification.

BACKGROUND OF THE INVENTION

1. Field of the Invention

The invention relates to an image sharpening method, and more particularly, to an image sharpening method in which a plurality of filters are utilized and weights of the filters can be adjusted, and an image processing device using the same.

2. Description of Related Art

In technical field of image processing, an image sharpening operation is used to highlight edges and textures in an image. Generally, a high pass filter can be used to execute a convolution operation, and a result of the convolution operation can be added back to the original image. Namely, said operation can increase an amplitude of a high-frequency coefficient in the image. However, such operation may also highlight a noise in the image. Or, in case the image includes a high contrast region (e.g., texts), said operation may induce a halo effect, a color ring effect or other effects. Accordingly, how to ensure that the noise in the image can be suppressed while providing a sharpened image with more preferable visual effect during the sharpening operation has became one of the major subjects for person skilled in the art.

SUMMARY OF THE INVENTION

The invention is directed to an image sharpening method and an image processing device, capable of dynamically executing a sharpening operation, so that an image being sharpened can provide a more preferable visual effect.

In an exemplary embodiment, an image sharpening method adapted to an image processing device is provided. The method includes: obtaining a plurality of pixels in an image; calculating a first weight of a high pass filter and a second weight of a first filter according to the pixels, and the first filter is a convolution of the high pass filter and a low pass filter; generating a sharpening filter according to the high pass filter, the first weight, the first filter and the second weight; and executing a sharpening operation on the pixels according to the sharpening filter.

In an exemplary embodiment, the step of calculating a first weight of the high pass filter according to the pixels includes: dividing a standard deviation of the pixels by a first preset standard deviation to obtain the first weight; and if the first weight is greater than a first preset value, setting the first weight to the first preset value.

In an exemplary embodiment, the step of calculating the second weight according to the pixels includes: subtracting the first weight from the first preset value to obtain the second weight.

In an exemplary embodiment, the step of executing the sharpening operation on the pixels according to the sharpening filter includes: calculating a first factor according to a standard deviation of the pixels; calculating a second factor according to a high contrast level of the pixels; calculating a gain value according to the first factor and the second factor; executing a convolution operation on the pixels according to the sharpening filter, and multiplying a result of the convolution operation by the gain value to obtain a sharpening value; and adding the sharpening value to one of the pixels.

In an exemplary embodiment, the step of calculating the first factor according to the standard deviation of the pixels includes: dividing a difference of the standard deviation minus a first offset by a first threshold value to obtain the first factor.

In an exemplary embodiment, the step of calculating the second factor according to the high contrast level of the pixels includes: executing the convolution operation on the pixels according to a first high pass filter to obtain a first numerical value; subtracting an absolute value of the first numerical value from a second offset to obtain a second numerical value; and dividing the second numerical value by a second threshold value to obtain the second factor.

In an exemplary embodiment, the image sharpening method further includes: if the first weight is greater than a first preset value, setting the first weight to the first preset value; if the first weight is less than a second preset value, setting the first weight to the second preset value; if the second factor is greater than the first preset value, setting the second factor to the first preset value; and if the second factor is less than the second preset value, setting the second factor to the second preset value.

In an exemplary embodiment, the step of calculating the gain value according to the first factor and the second factor includes: if the second factor is less than the first preset value, multiplying a preset gain value by the second factor to obtain the gain value; and if the second factor is greater than or equal to the first preset value, multiplying the preset gain value by the first factor to obtain the gain value.

In an exemplary embodiment, the high pass filter is a Laplacian filter and the low pass filter is a Gaussian filter.

From another perspective, in an exemplary embodiment of the invention, an image processing device including a multi-core computing circuit and a sharpening circuit is provided. The multi-core computing circuit is configured to obtain a plurality of pixels in an image, calculate a first weight of a high pass filter according to the pixels, calculate a second weight of a first filter according to the pixels, and generate a sharpening filter according to the high pass filter, the first weight, the first filter and the second weight. The first filter is a convolution of the high pass filter and a low pass filter. The sharpening circuit is coupled to the multi-core computing circuit, and configured to execute a sharpening operation on the pixels according to the sharpening filter.

In an exemplary embodiment, the multi-core computing circuit is configured to divide the standard deviation of the pixels by the first preset standard deviation to obtain the first weight. If the first weight is greater than a first preset value, the multi-core computing circuit sets the first weight to the first preset value.

In an exemplary embodiment, the multi-core computing circuit is configured to subtract the first weight from the first preset value to obtain the second weight.

In the exemplary embodiment, the image processing device further includes a noise detection circuit, a high contrast detection circuit and a gain control circuit. The noise detection circuit is configured to calculate a first factor according to a standard deviation of the pixels. The high contrast detection circuit is configured to calculate a second factor according to a high contrast level of the pixels. The gain control circuit is coupled to the noise detection circuit, the high contrast detection circuit and the sharpening circuit, and configured to calculate a gain value according to the first factor and the second factor. Therein, the sharpening circuit executes a convolution operation on the pixels according to the sharpening filter, multiplies a result of the convolution operation by the gain value to obtain a sharpening value, and adds the sharpening value to one of the pixels.

In an exemplary embodiment, the noise detection circuit is configured to divide a difference of the standard deviation of the pixels minus the first offset by the first threshold value to obtain the first factor.

In an exemplary embodiment, the high contrast detection circuit is configured to execute the convolution operation on the pixels according to a first high pass filter to obtain a first numerical value, subtract an absolute value of the first numerical value from a second offset to obtain a second numerical value, and divide the second numerical value by a second threshold value to obtain the second factor.

In an exemplary embodiment, if the first factor is greater than the first preset value, the noise detection circuit sets the first factor to the first preset value. If the first factor is less than a second preset value, the noise detection circuit sets the first factor to the second preset value. If the second factor is greater than the first preset value, the high contrast detection circuit sets the second factor to the first preset value. If the second factor is less than the second preset value, the high contrast detection circuit sets the second factor to the second preset value.

In an exemplary embodiment, if the second factor is less than the first preset value, the gain control circuit multiplies the preset gain value by the second factor to obtain the gain value. If the second factor is greater than or equal to the first preset value, the gain control circuit multiplies the preset gain value by the first factor to obtain the gain value.

In summary, in the image sharpening method and the image processing device provided by the exemplary embodiment of the invention, the weight of the high pass filter and the weight of the first filter can be dynamically adjusted. In particular, the first filter is a convolution of the high pass filter and a low pass filter, so that the noise can be suppressed while the sharpening operation is executed to provide a more preferable visual effect.

To make the above features and advantages of the disclosure more comprehensible, several embodiments accompanied with drawings are described in detail as follows.

DESCRIPTION OF THE EMBODIMENTS

Figures 1, 2:
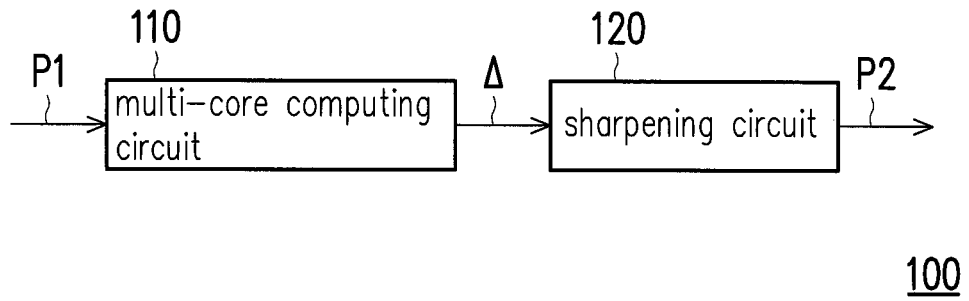
FIG. 1 is a block diagram illustrating an image processing device according to an exemplary embodiment.
FIG. 2 is a schematic diagram illustrating an example of a Laplacian filter according to an exemplary embodiment.

FIG. 1 is a block diagram illustrating an image processing device according to an exemplary embodiment.

Referring to FIG. 1, an image processing device 100 includes a multi-core computing circuit 110 and a sharpening circuit 120. The image processing device 100 may be implemented as computers, servers, distributed systems, televisions, smart phones, tablet computers, embedded systems or electronic devices in any forms, and the invention is not limited thereto.

The multi-core computing circuit 110 is configured to receive a plurality of pixels P1 in an image, calculate weights of a plurality of filters (also known as cores or masks) according to the pixels P1, and the weights of the filters can be different from each other. The multi-core computing circuit 110 generates a sharpening filter according to the filters and the corresponding weights, and the sharpening circuit 120 executes a sharpening operation on the pixel according to the sharpening filter, so as to output pixels P2.

For instance, the sharpening circuit 120 may execute the sharpening operation according to the following equation (1):

$$I'(x,y)=I(x,y)+g\times\Delta \qquad (1)$$

Therein, $I(x,y)$ is one pixel among the pixels P1 that represents a pixel at a x-th column and a y-th rows. g is a real number that represents a gain value. $\Delta$ is the sharpening filter being generated. $I'(x,y)$ represents a pixel being sharpened. More specifically, in case the sharpening filter has a size (dimension) being M-by-N, it indicates that the multi-core computing circuit 110 obtains a M×N number of the pixels P1 each time, in which M and N are positive integers. However, numerical values of the positive integers M and N are not particularly limited in the invention. The sharpening circuit 120 multiplies the sharpening filter by the gain value, executes the convolution operation on the M×N number of the pixels P1 according to the sharpening filter to obtain a sharpening value (i.e., g×Δ), and adds the sharpening value to the pixel $I(x,y)$. The convolution operation can also be deemed as multiplying each coefficient of the sharpening filter by the corresponding pixel among the pixels P1, so that the sharpening value can be obtained by adding multiplied results of above together. Nevertheless, persons skilled in the art should be able to understand the convolution operation, thus detailed description is omitted hereinafter. Or, in another exemplary embodiment, the sharpening circuit 120 may also add 1 to a coefficient at center of the sharpening filter, and a result of the convolution operation executed on the pixels P1 according to the sharpening filter can then be directly outputted as the pixels P2. Methods for executing the convolution operation according to the sharpening filter are not particularly limited in the invention.

Among all of the filters used in the multi-core computing circuit 110, one high pass filter and one first filter are at least included. The high pass filter can be a Laplacian filter, a Sobel filter, a Prewitt filter, a Bilateral filter or high pass filters of other types. In particular, the first filter herein is a convolution of the high pass filter and one low pass filter. The low pass filter may be a Gaussian filter, a mean filter, a median filter or low pass filters of other types. In case the high pass filter being the Laplacian filter while the low pass filter being the Gaussian filter, the first filter is also referred to as a Laplacian of Gaussian (LoG) filter. The multi-core computing circuit 110 generates the sharpening filter according to at least the high pass filter, a weight of the high pass filter (i.e., the first weight), the first filter, and a weight of the first filter (i.e., the second weight). For instance, the multi-core computing circuit 110 performs calculation according to the following equation (2), in which the high pass filter is multiplied by the corresponding first weight, the first filter is multiplied by the corresponding second weight, and the sharpening value is obtained by adding said two filters together.

$$\Delta=\alpha\times\Delta_1+\beta\times\Delta_2 \qquad (2)$$

Therein, Δ is the sharpening filter, a is the first weight, Δ₁ is the high pass filter, β is the second weight and Δ₂ is the first filter. Take the Laplacian filter and the Gaussian filter as an example, the Laplacian filter can be represented by the following equation (3), the Gaussian filter can be represented by the following equation (4), and the LoG filter can be represented by the following equation (5).

$$L(x, y) = \frac{\partial^2 f}{\partial x^2} + \frac{\partial^2 f}{\partial y^2} \quad (3)$$

$$G(x, y) = \frac{1}{\sqrt{2\pi\sigma^2}} \exp\left[-\frac{x^2 + y^2}{2\sigma^2}\right] \quad (4)$$

$$LoG(x, y) = -\frac{1}{\pi\sigma^2}\left[1 - \frac{x^2 + y^2}{2\sigma^2}\right] e^{-\frac{x^2+y^2}{2\sigma^2}} \quad (5)$$

Figures 3, 4:
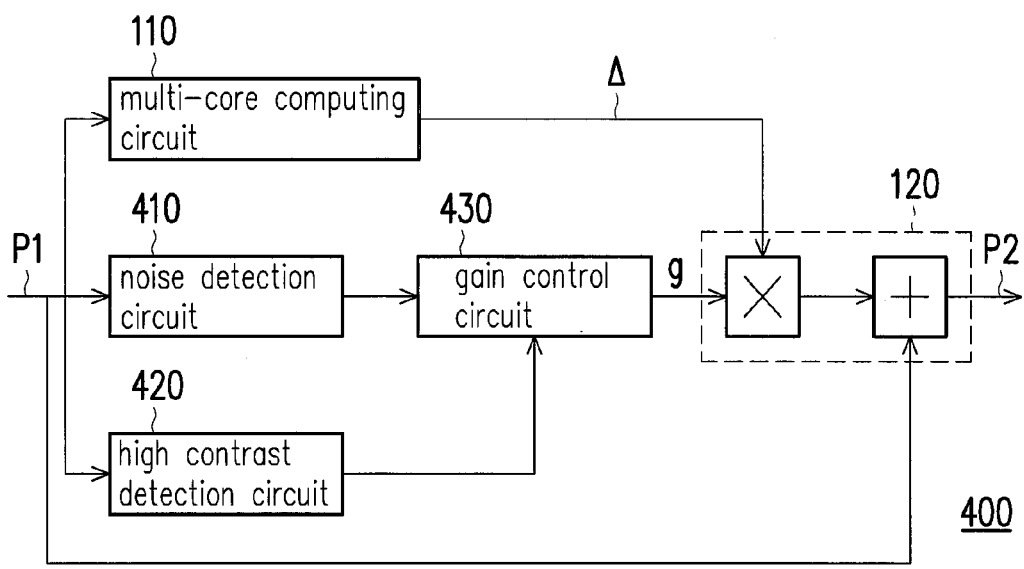
FIG. 3 is a schematic diagram illustrating an example of a Laplacian of Gaussian filter according to an exemplary embodiment.
FIG. 4 is a block diagram illustrating an image processing device according to another exemplary embodiment.

In the equations (3) to (5), x and y represent a x coordinate and a y coordinate in the filter, respectively. In the equations (4) and (5), a represents a standard deviation, but the value of the standard deviation is not particularly limited in the invention. For instance, FIG. 2 is a schematic diagram illustrating an example of a Laplacian filter according to an exemplary embodiment. FIG. 3 is a schematic diagram illustrating an example of a Laplacian of Gaussian filter according to an exemplary embodiment. Referring to FIG. 2, filters 201 to 204 are the Laplacian filter of different types. It should be noted that, the size of the filters 201 to 203 are 3-by-3, and the size of the filter 204 is 3-by-1. Sizes and coefficients in the Laplacian filter are not particularly limited in the invention. Referring to FIG. 3, filters 301 to 302 are the LoG filter of different types. Similarly, sizes and coefficients in the LoG filter are not particularly limited in the invention.

In an exemplary embodiment, the multi-core computing circuit 110 calculates the first weight corresponding to the Laplacian filter according to the following equations (6) and (7).

$$\alpha = \frac{\sqrt{\frac{1}{M \times N}\left[\begin{array}{c}(x_{11} - \mu)^2 + (x_{12} - \mu)^2 + \\ (x_{13} - \mu)^2 + \ldots + (x_{MN} - \mu)^2\end{array}\right]}}{\sigma_{th}} \quad (6)$$

$$\mu = \frac{1}{M \times N}(x_{11} + x_{12} + x_{13} + \ldots + x_{MN}) \quad (7)$$

In the equations (6) and (7), $x_{11}$ represents a pixel at a first column and a first row among the pixels P1, and the rest may be deduced by analogy. $\sigma_{th}$ is a real number which is also referred to as a first preset standard deviation. μ is an average value of pixels $x_{11}$ to $x_{MN}$. In other words, the multi-core computing circuit 110 divides the standard deviation of the pixels P1 by the first preset standard deviation $\sigma_{th}$ to obtain the first weight α. Further, if the first weight α is greater than a first preset value, the multi-core computing circuit 110 sets the first weight α to the first preset value. In the present exemplary embodiment, the first preset value is 1. However, in other exemplary embodiments, the first preset value can also be other real numbers, and the invention is not limited thereto. After the first weight α is calculated, the multi-core computing circuit 110 subtracts the first weight α from the first preset value to obtain the second weight β.

Generally, the Laplacian filter highlights edges in the image, but an intensity of a noise can also be enhanced; and the LoG is utilized to suppressing the noise being enhanced, but other visual side effects may be induced. The multi-core computing circuit 110 adjusts the weights of the two filters according to a content of the image. Accordingly, the pixels executed by the sharpening operation provide a more preferable visual effect.

FIG. 4 is a block diagram illustrating an image processing device according to another exemplary embodiment.

Referring to FIG. 4, in the exemplary embodiment of FIG. 4, an image processing device 400 includes a multi-core computing circuit 110, a sharpening circuit 120, a noise detection circuit 410, a high contrast detection circuit 420 and a gain control circuit 430. The gain control circuit 430 is coupled to the noise detection circuit 410, the high contrast detection circuit 420 and the sharpening circuit 120. The multi-core computing circuit 110 and the sharpening circuit 120 have been described the foregoing embodiment, thus related descriptions are omitted hereinafter. The noise detection circuit 410, the high contrast detection circuit 420 and the gain control circuit 430 are configured to calculate the gain value g in the equation (1).

More specifically, the noise detection circuit 410 calculates a first factor according to a standard deviation of the pixels P1. The high contrast detection circuit 420 calculates a second factor according to a high contrast level of the pixels P1. The gain control circuit 430 calculates the gain value g according to the first factor and the second factor. In the exemplary embodiment of FIG. 4, the sharpening circuit 120 executes the convolution operation on the pixels P1 according to the sharpening filter Δ, multiplies the result of the convolution operation by the gain value g, and adds the sharpening value to one pixel among the pixels P1 to output the pixel P2.

The first factor is configured to detect a gentle noise region. In an embodiment, the first factor represents a noise level in regions adjacent to the pixels P1. For instance, the noise detection circuit 410 may generate the first factor according to the following equation (8):

$$factor1 = \frac{\sqrt{\frac{1}{M \times N}\left[\begin{array}{c}(x_{11} - \mu)^2 + (x_{12} - \mu)^2 + \\ (x_{13} - \mu)^2 + \ldots + (x_{MN} - \mu)^2\end{array}\right]} - shift1}{thd1} \quad (8)$$

shift1 is a real number which is referred to as a first offset. thd1 is a real number which is referred to as a first threshold value. In other words, the noise detection circuit 410 divides a difference of the standard deviation of the pixels P1 minus the first offset by the first threshold value to obtain the first factor. If the first factor is greater than the first preset value (e.g., 1), the noise detection circuit 410 sets the first factor to the first preset value. If the first factor is less than a second preset value (e.g., 0), the noise detection circuit 410 sets the first factor to the second preset value. In other words, the first factor is between the first preset value and the second preset value.

On the other hand, the second factor is configured to represent whether a high contrast region (such as texts) is provided in the pixels P1. In the present exemplary embodiment, the high contrast level is represented by the result of the convolution operation executed on the pixels P1 according to a first high pass filter. More specifically, the high contrast detection circuit 420 executes the convolution operation on the pixels P1 according to the first high pass filter to obtain a first numerical value. The high contrast detection circuit 420 subtracts an absolute value of the first numerical value from a second offset to obtain a second numerical value, and divides the second numerical value by a second threshold value to obtain the second factor. For instance, in case the first high pass filter is the filter 201 depicted in FIG. 2, the high contrast detection circuit 420 calculates the second factor according to the following equation (9).

$$factor2 = \frac{shift2 - \begin{vmatrix} 4 \times I(x, y) - I(x-1, y) - \\ I(x+1, y) - I(x, y-1) - \\ I(x, y+1) \end{vmatrix}}{thd2} \quad (9)$$

shift2 is a real number which is referred to as the second offset. thd2 is a real number which is referred to as the second threshold value. If the second factor is greater than the first preset value, the high contrast detection circuit 420 sets the second factor to the first preset value. If the second factor is less than the second preset value, the high contrast detection circuit 420 sets the second factor to the second preset value. In other words, the second factor is also between the first preset value and the second preset value.

After the first factor and the second factor are calculated, the gain control circuit 430 multiplies one of the first factor and the second factor by a preset gain value to obtain the gain value g. More specifically, the gain control circuit 430 first determines whether the second factor is less than the first preset value. If the second factor is less than the first preset value, the gain control circuit 430 multiplies the preset gain value by the second factor to obtain the gain value g. If the second factor is greater than or equal to the first preset value, the gain control circuit 430 multiplies the preset gain value by the first factor to obtain the gain value g. In other words, in case the first preset value is 1, the operation of the gain control circuit 430 can be represented by the following equations (10) and (11). Therein, $Gain_{fix}$ is a real number which is referred to as the preset gain value.

$$\text{if } factor2 < 1, g = Gain_{fix} \times factor2 \quad (10)$$

$$\text{if } factor2 \geq 1, g = Gain_{fix} \times factor1 \quad (11)$$

Figure 5:
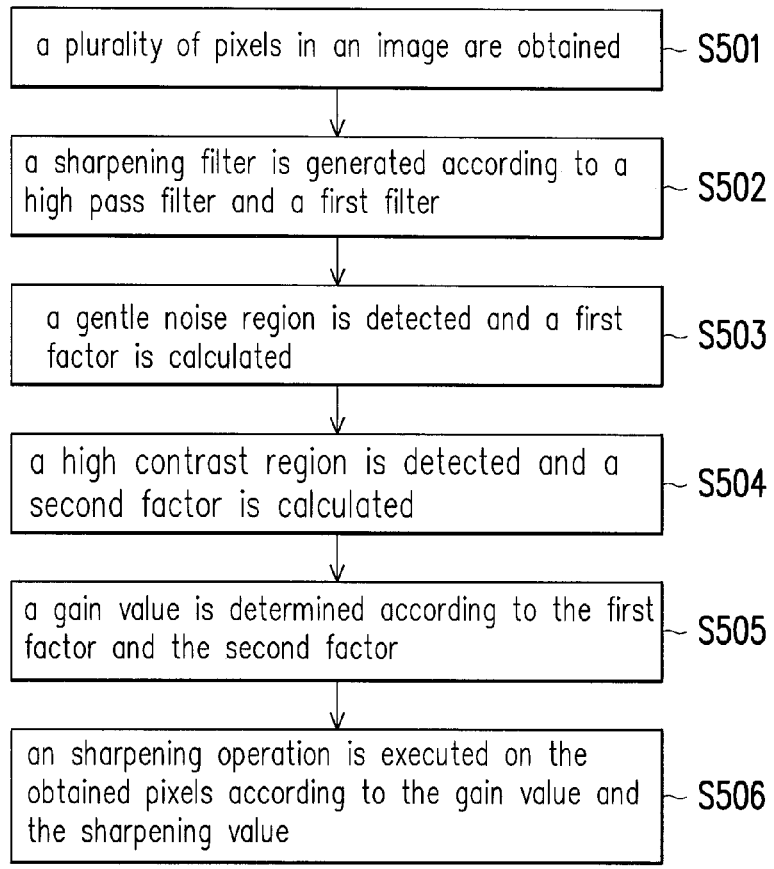
FIG. 5 is a flowchart illustrating operations of the image processing device 400 according to an exemplary embodiment.

FIG. 5 is a flowchart illustrating operations of the image processing device 400 according to an exemplary embodiment.

Referring to FIG. 5, in step S501, the multi-core computing circuit 110 obtains a plurality of pixels in an image. In step S502, the multi-core computing circuit 110 generates a sharpening filter according to a high pass filter and a first filter. In step S503, the noise detection circuit 410 detects a gentle noise region and calculates a first factor. In step S504, the high contrast detection circuit 420 detects a high contrast region and calculates a second factor. In step S505, the gain control circuit 430 determines a gain value according to the first factor and the second factor. In step S506, the sharpening circuit 120 executes a sharpening operation on the obtained pixels according to the gain value and the sharpening filter. Nevertheless, steps depicted in FIG. 5 are described in detail in the foregoing embodiment; thus related description is omitted hereinafter.

Figure 6:
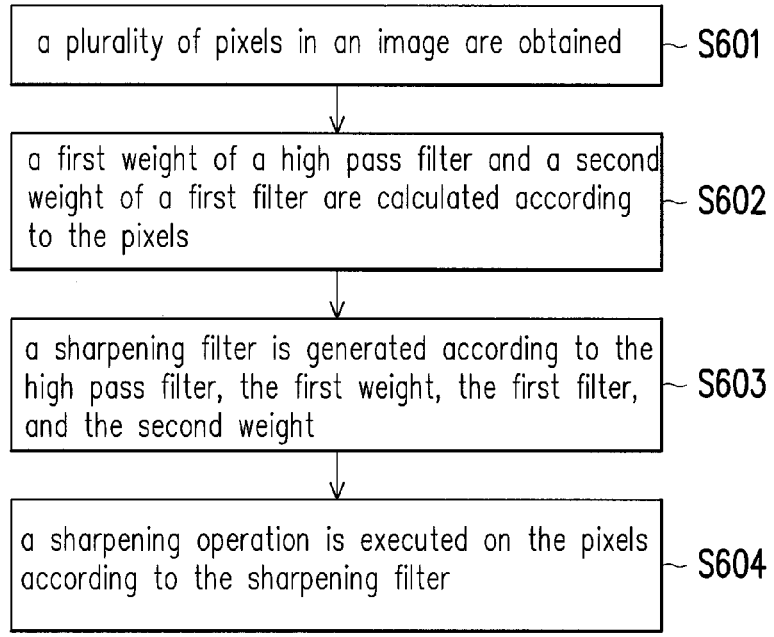
FIG. 6 is a flowchart illustrating an image sharpening method according to an exemplary embodiment.

FIG. 6 is a flowchart illustrating an image sharpening method according to an exemplary embodiment.

Referring to FIG. 6, in step S601, a plurality of pixels in an image are obtained. In step S602, a first weight of a high pass filter and a second weight of a first filter are calculated according to the pixels. In step S603, a sharpening filter is generated according to the high pass filter, the first weight, the first filter, and the second weight. In step S604, a sharpening operation is executed on the pixels according to the sharpening filter. Nevertheless, steps depicted in FIG. 6 are described in detail as above, thus related description is omitted hereinafter. It should be noted that, each of steps in FIG. 6 can be implemented as a plurality of program codes or circuits (e.g., the multi-core computing circuit 110 and the sharpening circuit 120), and the invention is not limited thereto. Moreover, the method disclosed in FIG. 6 may be implemented with reference to above embodiments, or may be implemented separately; the invention is not limited thereto.

In summary, in the image sharpening method and the image processing device provided by the exemplary embodiment of the invention, the sharpening filter is generated by using at least two filters. Furthermore, the weights of the at least two filters can be dynamically determined. In an exemplary embodiment, the gain value can also be dynamically determined. Therefore, different sharpening levels can be provided to different regions in the image, such that the image being sharpened can provide a more preferable visual effect.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An image sharpening method adapted to an image processing device, comprising:
    obtaining a plurality of pixels in an image;
    calculating a first weight of a high pass filter and a second weight of a first filter according to the pixels, wherein the first filter is a convolution of the high pass filter and a low pass filter;
    generating a sharpening filter according to the high pass filter, the first weight, the first filter and the second weight; and
    executing a sharpening operation on the pixels according to the sharpening filter.

2. The image sharpening method of claim 1, wherein the step of calculating the first weight of the high pass filter according to the pixels comprises:
    dividing a standard deviation of the pixels by a first preset standard deviation to obtain the first weight; and
    if the first weight is greater than a first preset value, setting the first weight to the first preset value.

3. The image sharpening method of claim 2, wherein the step of calculating the second weight according to the pixels comprises:
    subtracting the first weight from the first preset value to obtain the second weight.

4. The image sharpening method of claim 1, wherein the step of executing the sharpening operation on the pixels according to the sharpening filter comprises:
    calculating a first factor according to a standard deviation of the pixels;
    calculating a second factor according to a high contrast level of the pixels;
    calculating a gain value according to the first factor and the second factor;
    executing a convolution operation on the pixels according to the sharpening filter, and multiplying a result of the convolution operation by the gain value to obtain a sharpening value; and
    adding the sharpening value to one of the pixels.

5. The image sharpening method of claim 4, wherein the step of calculating the first factor according to the standard deviation of the pixels comprises:

dividing a difference of the standard deviation minus a first offset by a first threshold value to obtain the first factor.

6. The image sharpening method of claim 5, wherein the step of calculating the second factor according to the high contrast level of the pixels comprises:

executing the convolution operation on the pixels according to a first high pass filter to obtain a first numerical value;

subtracting an absolute value of the first numerical value from a second offset to obtain a second numerical value; and dividing the second numerical value by a second threshold value to obtain the second factor.

7. The image sharpening method of claim 6, further comprising:

if the first factor is greater than a first preset value, setting the first factor to the first preset value;

if the first factor is less than a second preset value, setting the first factor to the second preset value;

if the second factor is greater than the first preset value, setting the second factor to the first preset value; and if the second factor is less than the second preset value, setting the second factor to the second preset value.

8. The image sharpening method of claim 7, wherein the step of calculating the gain value according to the first factor and the second factor comprises:

if the second factor is less than the first preset value, multiplying a preset gain value by the second factor to obtain the gain value; and if the second factor is greater than or equal to the first preset value, multiplying the preset gain value by the first factor to obtain the gain value.

9. The image sharpening method of claim 1, wherein the high pass filter is a Laplacian filter and the low pass filter is a Gaussian filter.

10. An image processing device, comprising:

a multi-core computing circuit configured to obtain a plurality of pixels in an image, calculate a first weight of a high pass filter according to the pixels, calculate a second weight of a first filter according to the pixels, and generate a sharpening filter according to the high pass filter, the first weight, the first filter and the second weight, wherein the first filter is a convolution of the high pass filter and a low pass filter;

a sharpening circuit coupled to the multi-core computing circuit, and configured to execute a sharpening operation on the pixels according to the sharpening filter.

11. The image processing device of claim 10, wherein the multi-core computing circuit is configured to divide a standard deviation of the pixels by a first preset standard deviation to obtain the first weight, wherein if the first weight is greater than a first preset value, the multi-core computing circuit sets the first weight to the first preset value.

12. The image processing device of claim 11, wherein the multi-core computing circuit is configured to subtract the first weight from the first preset value to obtain the second weight.

13. The image processing device of claim 10, further comprising:

a noise detection circuit configured to calculate a first factor according to a standard deviation of the pixels;

a high contrast detection circuit configured to calculate a second factor according to a high contrast level of the pixels; and a gain control circuit coupled to the noise detection circuit, the high contrast detection circuit and the sharpening circuit, and configured to calculate a gain value according to the first factor and the second factor, wherein the sharpening circuit executes a convolution operation on the pixels according to the sharpening filter, multiplies a result of the convolution operation by the gain value to obtain a sharpening value, and adds the sharpening value to one of the pixels.

14. The image processing device of claim 13, wherein the noise detection circuit is configured to divide a difference of the standard deviation minus a first offset by a first threshold value to obtain the first factor.

15. The image processing device of claim 14, wherein the high contrast detection circuit is configured to execute the convolution operation on the pixels according to a first high pass filter to obtain a first numerical value, subtract an absolute value of the first numerical value from a second offset to obtain a second numerical value, and divide the second numerical value by a second threshold value to obtain the second factor.

16. The image processing device of claim 15, wherein if the first factor is greater than a first preset value, the noise detection circuit sets the first factor to the first preset value, if the first factor is less than a second preset value, the noise detection circuit sets the first factor to the second preset value, if the second factor is greater than the first preset value, the high contrast detection circuit sets the second factor to the first preset value, and if the second factor is less than the second preset value, the high contrast detection circuit sets the second factor to the second preset value.

17. The image processing device of claim 16, wherein if the second factor is less than the first preset value, the gain control circuit multiplies a preset gain value by the second factor to obtain the gain value, if the second factor is greater than or equal to the first preset value, the gain control circuit multiplies the preset gain value by the first factor to obtain the gain value.

18. The image processing device of claim 10, wherein the high pass filter is a Laplacian filter and the low pass filter is a Gaussian filter.

* * * * *